United States Patent [19]
Aizawa et al.

[11] Patent Number: 6,164,735
[45] Date of Patent: Dec. 26, 2000

[54] VEHICLE BRAKE CONTROL SYSTEM

[75] Inventors: Hiroaki Aizawa, Kariyu; Akihito Kusano, Toyota; Hiroshi Toda, Kariya, all of Japan

[73] Assignee: Aisin Seiki Kabushiki Kaisha, Kariya, Japan

[21] Appl. No.: 09/218,071

[22] Filed: Dec. 22, 1998

[30] Foreign Application Priority Data

Dec. 22, 1997 [JP] Japan ..................................... 9-353413

[51] Int. Cl.[7] ....................................................... B60T 8/00
[52] U.S. Cl. ............................................. 303/155; 303/20
[58] Field of Search ..................................... 303/168, 155, 303/3, 20, 113.4, 166, DIG. 3, DIG. 4, 199, DIG. 1, 195, 196, 191, 167, 174, 175, 176; 701/70

[56] References Cited

U.S. PATENT DOCUMENTS 5,378,052  1/1995  Yoshino ................................. 303/155

FOREIGN PATENT DOCUMENTS 1961039  12/1969  Germany .

*Primary Examiner*—Douglas C. Butler
*Attorney, Agent, or Firm*—Burns, Doane, Swecker & Mathis, LLP

[57] ABSTRACT

A vehicle brake control system includes a detecting device that receives a driver's braking intention which is in the form of a physical variable and outputting an electric signal indicating the intention, a vehicle brake device that establishes a brake operation by applying a braking force to a wheel brake device, and a control device that controls the vehicle brake device such that the braking force is in the form of an independent braking force of the electric signal and a dependent braking force on the electric signal at an initial stage and at a successive stage thereof, respectively.

6 Claims, 9 Drawing Sheets

VEHICLE BRAKE CONTROL SYSTEM

This application corresponds to and claims priority under 35 U.S.C. § 119 with respect to Japanese Application No. 09(1997)-353413 filed on Dec. 22, 1997, the entire content of which is incorporated herein by reference.

FIELD OF THE INVENTION

The present invention generally relates to a vehicle brake control system. More particularly, the present invention pertains to a vehicle brake control system in which one or more variables such as the operation force and/or the stroke of the brake operation member are detected by a detecting device, and based on such variables an electric signal is issued to a control device for controlling vehicle brake operation.

BACKGROUND OF THE INVENTION

German Offenlegungsschrift No. 1961039 discloses a vehicle brake control system that is designed to control vehicle brake operation. In this system, from initiation of the vehicle brake operation, an electric signal to which the brake operation corresponds and which is based on a detected variable of a brake operation member is used as is.

However, the technique associated with manipulating the brake operation member differs from one driver to the next, and the magnitude of the so-called "shock" upon the initial stage of brake operation varies over a wide range. That is, in some instances, the variable is extremely large beginning with the initiation of the brake operation, while on other occasions the variable is small at the initiation of the brake operation, but rises rather drastically. Thus, the aforementioned shock inevitably occurs.

In light of the foregoing, a need exists for a vehicle brake control system that is not susceptible of the same disadvantages and drawbacks as those discussed above.

It would be desirable to provide a vehicle brake control system in which during an initial stage of brake operation, the shock is restricted to an as small as possible amount to thereby make the vehicle more stable independent of a driver's own braking technique.

SUMMARY OF THE INVENTION

In light of the foregoing, the present invention provides a vehicle brake control system that includes a detecting device that receives a driver's braking intention which is in the form of a physical variable and outputting an electric signal indicating the intention, a vehicle brake device that establishes a brake operation by applying a braking force to a wheel brake device, and a control device that controls the vehicle brake device such that the braking force is in the form of an independent braking force of the electric signal and a dependent braking force on the electric signal at an initial stage and at a successive stage thereof, respectively.

According to another aspect of the present invention, a vehicle brake control system includes a vehicle brake force detecting device that outputs an electric signal representing a physical variable as a vehicle braking force upon movement, a vehicle brake operation quantity detecting device that outputs an electric signal representing a vehicle brake operation quantity, and a control device which calculates an actual value of the physical variable based on the electric signal from the vehicle brake force detecting signal. The control device also calculates a target value of the physical value based on the electric signal from the vehicle brake operation quantity detecting device, and controls an input to a vehicle brake device by bringing a deviation between the actual and target values to zero. The control device is adapted to operate such that at an initial stage of the brake operation, an initial target value is generated using a predetermined target value which does not correspond to the electric signal from the brake operation quantity detecting device.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
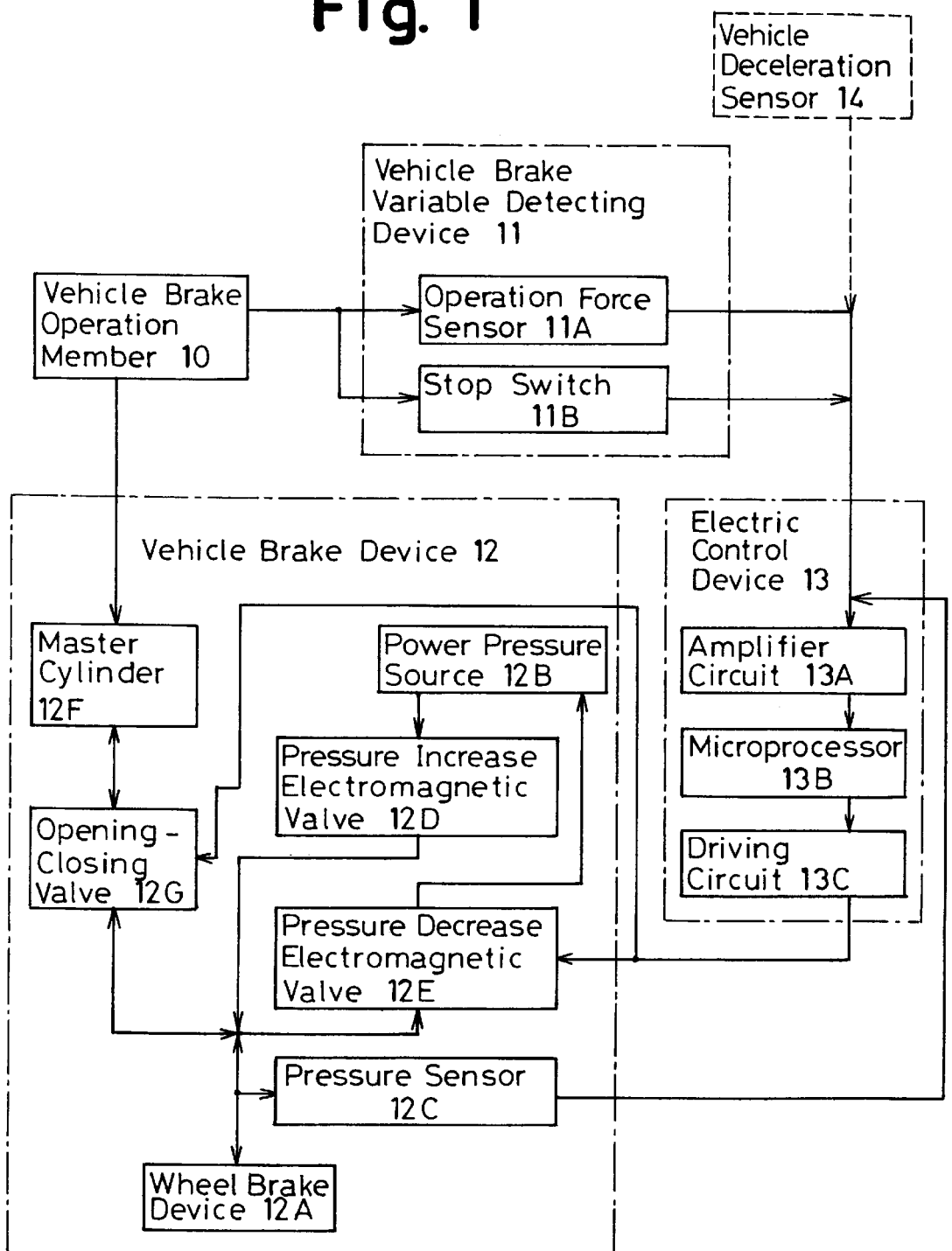
FIG. 1 is a block diagram illustrating the overall structure of a vehicle brake control system in accordance with the present invention.

Referring initially to FIG. 1, the overall structure of the vehicle brake control system according to the present invention includes a vehicle brake operation member 10, a vehicle brake variable detecting device 11, a vehicle brake device 12, and an electric control device 13. The vehicle brake operation member 10 may be in the form of a brake pedal. The vehicle brake variable detecting device 11 includes an operation force sensor 11A and a stop switch 11B. The operation force sensor 11A issues or outputs an electric signal corresponding to the operating force applied to the vehicle brake operation member 10 by detecting such a force, and the stop switch 11B is turned on or closed whenever the operating force is applied.

The vehicle brake device 12, which may be in the form of a hydraulic braking device, includes a wheel brake device 12A which applies a brake torque to a wheel based on the hydraulic pressure supplied to the brake device, a power pressure source 12B which stores an amount of pressure that is to be supplied to the wheel brake device 12A, a pressure sensor 12C which outputs an electric signal corresponding to the pressure in the wheel brake device 12A by detecting such pressure, a pressure increase electromagnetic valve 12D which functions to regulate the pressure supply from the power pressure source 12B to the wheel brake device 12A, a pressure decrease electromagnetic valve 12E which regulates the pressure exhaust from of the wheel brake device 12A, a master cylinder 12F which generates the hydraulic pressure to be supplied to the wheel brake device 12A immediately whenever the power pressure source 12B is determined to be in an unexpected or malfunction condition, and an opening-closing valve 12G which maintains an isolated condition of the master cylinder 12F from the wheel brake device 12A so long as the power pressure source 12B is in the normal or expected condition.

The electric control device 13 includes an amplifier circuit 13A which amplifies the electric signal from each of the operation force sensor 11A, the stop switch 11B, and the pressure sensor 12C. The electric control device 13 also includes a microprocessor 13B which generates an electromagnetic valve drive signal corresponding to the hydraulic pressure to be supplied to the wheel brake device 12A by a calculation based on the electric signals from the operation force sensor 11A and the stop switch 11B. The electric control device 13 further includes a driving circuit 13C for feeding the valve drive signal generated at the microprocessor 13B to electromagnetic valve means in the manner described below in more detail.

Figure 2:
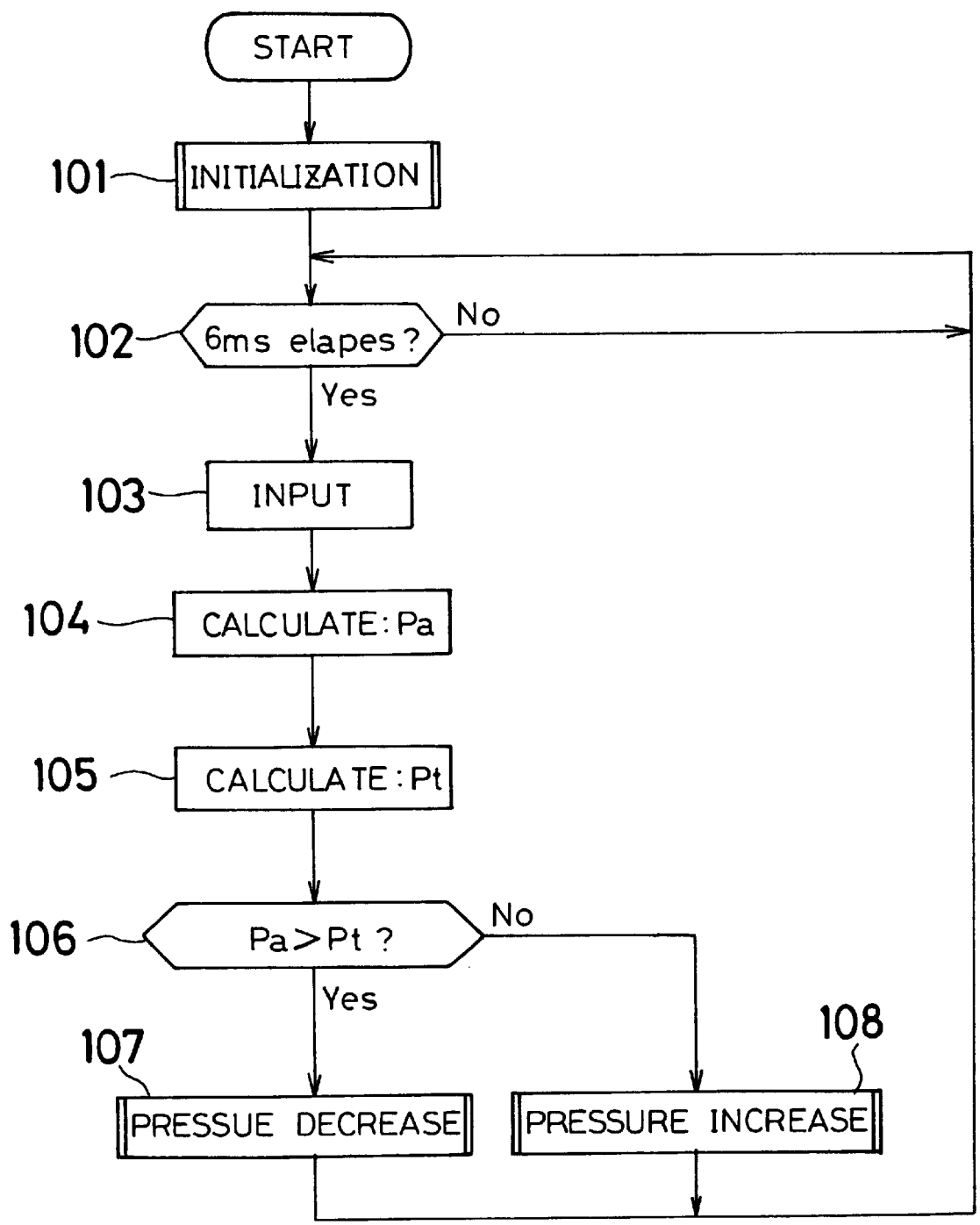
FIG. 2 is a flowchart indicating the overall operation of the vehicle brake control system shown in FIG. 1.

FIG. 2 shows a flowchart of the program routine performed by the microprocessor 13B of the control device 13. The program routine starts when an ignition switch (not shown) is turned on or closed. At step 101, an initialization is made and then at step 102, a time elapse of 6 milliseconds is checked. If 6 ms has elapsed, the program routine proceeds to step 103. At step 103, an input procedure is conducted by receiving or reading signals from the operation force sensor 11A, the stop switch 11B, and the pressure sensor 12C, respectively. Then, at step 104, a real pressure Pa in the wheel brake device 12A is calculated. At step 105, as will be described in more detail later, a target pressure Pt in the wheel brake device 12A is calculated based on the output signals from the operation force sensor 11A and the stop switch 11B, respectively. At step 106, it is checked whether or not the real pressure Pa is greater than the target pressure Pt. If the real pressure Pa is greater than the target pressure Pt, the program proceeds to step 107 where a pressure decrease operation is performed by driving the pressure decrease electromagnetic valve 12E in accordance with the deviation between the real pressure Pa and the target pressure Pt. Thereafter, the program routine returns to step 102.

If it is determined at step 106 that the real pressure Pa is not greater than the target pressure Pt, the program proceeds to step 108 where a pressure increase operation is performed by driving the pressure increase electromagnetic valve 12D in accordance with the deviation between the real pressure Pa and the target pressure Pt. Thereafter, the program routine returns to step 102.

Figure 3:
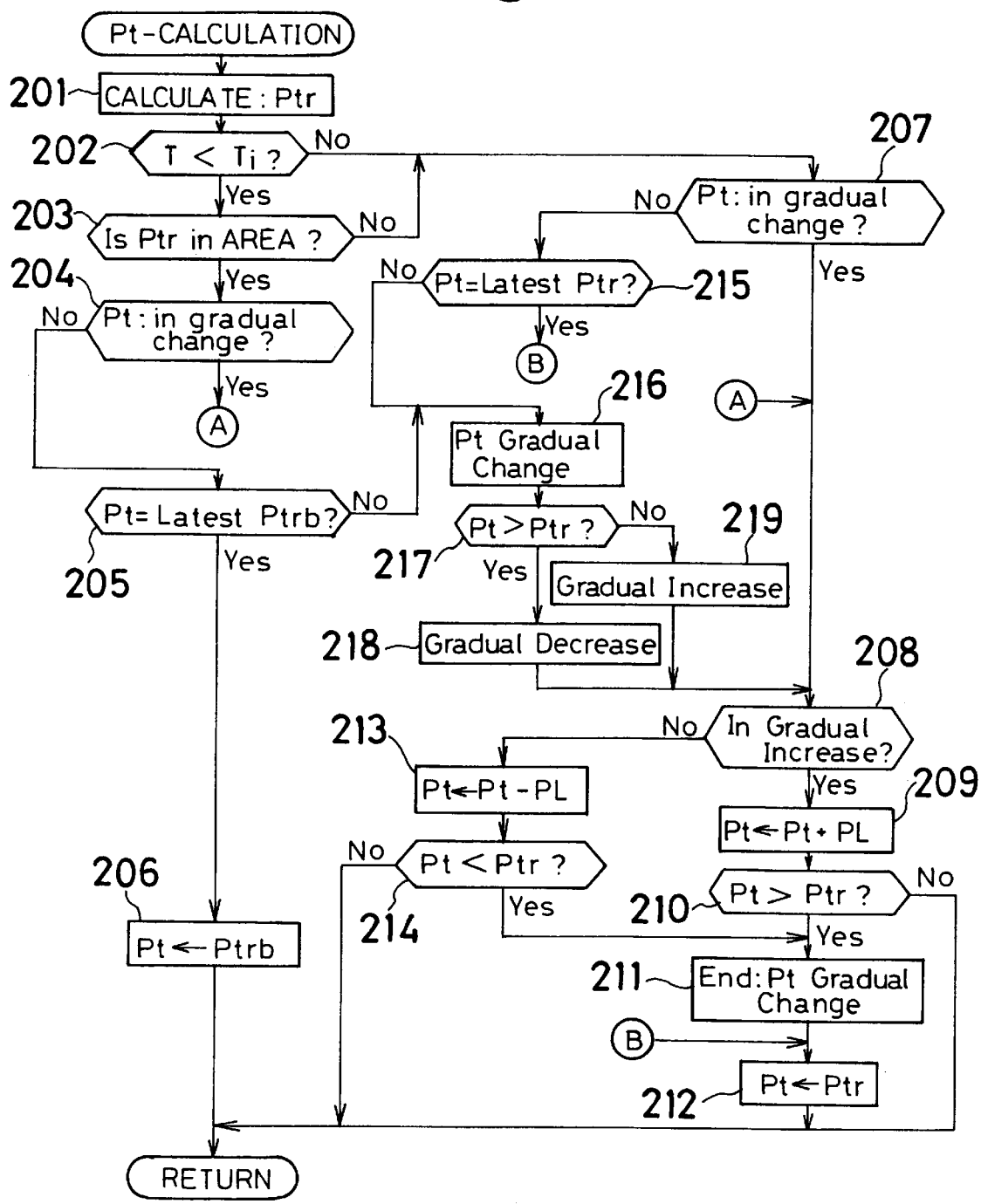
FIG. 3 is a flowchart illustrating the way in which the target pressure Pt is calculated.

FIG. 3 is a flowchart showing in detail how the target pressure Pt is set at step 105 in the flowchart shown in FIG. 2. First, at step 201 in FIG. 3, a basic target pressure Ptr is calculated using a map or graph setting forth the relationship between the operation force and the pressure in the wheel brake device 12A. Next, at step 202, it is checked whether or not an elapsed time T from the initiation of brake operation, which is determined by the point in time Ts when the stop switch is turned on, is less than a threshold value Ti. If the elapsed time T is less than the threshold value Ti (i.e., if the result in step 202 is positive), the braking operation is considered to be at its initial stage. On the other hand, if the elapsed time T is greater than the threshold value Ti (i.e., if the result in step 202 is negative), the braking operation is considered to be at its post-initial stage. In short, step 202 is designed to judge whether or not the braking operation is at the initial stage.

Figure 5:
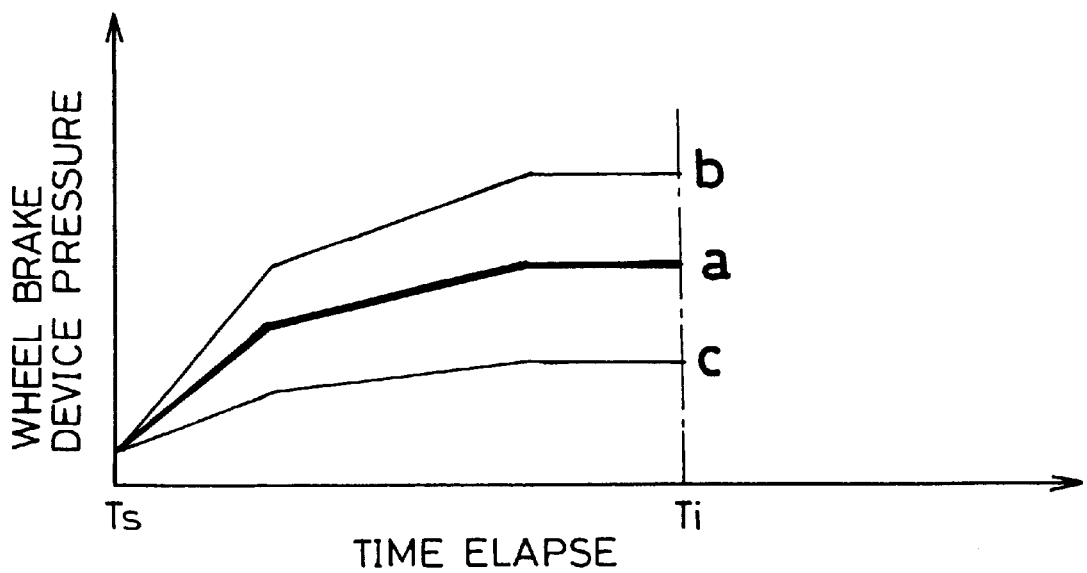
FIG. 5 is a graph showing alternate target pressures during an initial stage of brake operation.

If the elapsed time T is less than the threshold value Ti, the program routine proceeds to step 203 to check whether the basic target pressure Ptr falls within the region between the two real lines "b" and "c" shown in the graph of FIG. 5. In FIG. 5, a real line or target line "a" denotes a predetermined target pressure Ptbb having an increase rate that is set to establish an as small as possible or an as minimum as possible brake shock at the initial stage of the braking operation. The real line "b" indicates an upper permissible deviation from the real line "a". The real line "c" indicates a lower permissible deviation from the real line "a". The real lines "b" and "c" are set in light of the fact that in the region between the real lines "b" and "c" the operation force during normal braking operation inevitably varies due to the braking technique of each driver. Usually, during normal brake operation, the basic target pressure Ptr lies in the region between the real lines "b" and "c". If the basic target pressure falls outside the region defined by the lines "b" and "c", it is to be understood that the driver has made an intentional braking operation. For example, in the case of a rapid brake operation, the basic target pressure Ptr lies above the real line "b".

If the result of the determination in step 203 reveals that the basic target pressure Ptr falls inside the region between the real lines "b" and "c", step 204 is executed to check whether or not a gradual target pressure Pt change procedure is being performed. The gradual target pressure Pt change procedure is a procedure for gradually bringing either the basic target pressure Ptr or the predetermined target pressure Ptrb near to the other one. This procedure is executed at step 208. If the gradual target pressure Pt change procedure is not being performed, the program routine proceeds to step 205 to check whether or not the latest value of the target pressure Pt is equal to the latest value of the predetermined target pressure Ptrb. In other words, in step 205, it is determined whether or not the target pressure Pt at this time is entering inside the region from outside. If the determination in step 205 is positive, it is understood to not be the case, whereupon the value of the predetermined target pressure Ptrb is substituted for the target pressure Pt in step 206. After such replacement, the program routine proceeds to RETURN.

As noted above, if the determination in step 204 reveals that the target pressure Pt is being changed gradually, the program routine proceeds to step 208 to check whether or not such a gradual change of the target pressure Pt is in the direction of increase. If so, at step 209, the current value of the target pressure Pt is calculated by adding the latest value of the target pressure Pt with a value of PL. Then, at step 210, it is determined whether or not the target pressure Pt is greater than the basic target pressure Ptr. If so, the program routine proceeds to step 211 where the termination of the gradual increase procedure of the target pressure Pt is conducted. Then, after substituting the value of the basic target pressure Ptr for the target pressure Pt in step 212, the program routine proceeds to RETURN.

If the result of step 208 indicates that no gradual increase procedure of the target pressure Pt is being executed or that the target pressure Pt is being gradually decreased, the program routine proceeds to step 213 and the current value of the target pressure Pt is calculated by subtracting the value of PL from the target pressure Pt. Then, at step 214 it is determined whether or not the target pressure Pt is less than the basic target pressure Ptr. If so, the program routine proceeds to step 211. If not, the program routine proceeds to RETURN.

If the result of the determination in step 205 reveals that the latest value of the target pressure Pt is not equal to the latest value of the predetermined target pressure Ptrb, the program proceeds to step 216 where the target pressure Pt gradual change procedure is initiated. Then, the program routine proceeds to step 217. At step 217, it is determined whether or not the target pressure Pt is greater than the basic target pressure Ptr. If so, after initiating the target pressure Pt gradual decrease procedure at step 218, the program routine proceeds to step 208. If not, after initiating the target pressure Pt gradual increase procedure at step 219, the program routine proceeds to step 208.

In the situation where the determination in step 202 indicates that the elapsed time T is not less than the threshold value Ti or where the determination in step 203 indicates that the basic target pressure Ptr falls on the outside of the region defined by the real lines "b" and "c" as shown in FIG. 5, the program routine proceeds to step 207. In step 207, it is determined whether or not the target pressure Pt gradual change procedure is being executed. If so, the program routine proceeds to step 208. If not, step 215 is executed to check whether or not the latest value of the target pressure Pt is equal to the latest basic target pressure Ptr. If the result of step 215 is positive, the program proceeds to step 212. If the result of step 215 is negative, the program proceeds to step 216.

Figure 4:
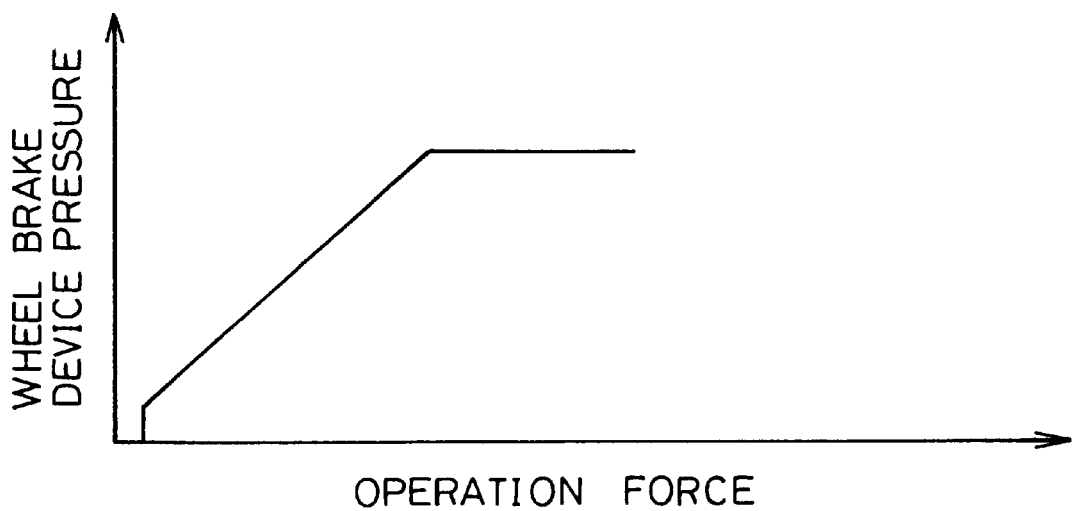
FIG. 4 is a graph showing the relationship between an operation force and a basic target pressure.
Figure 6:
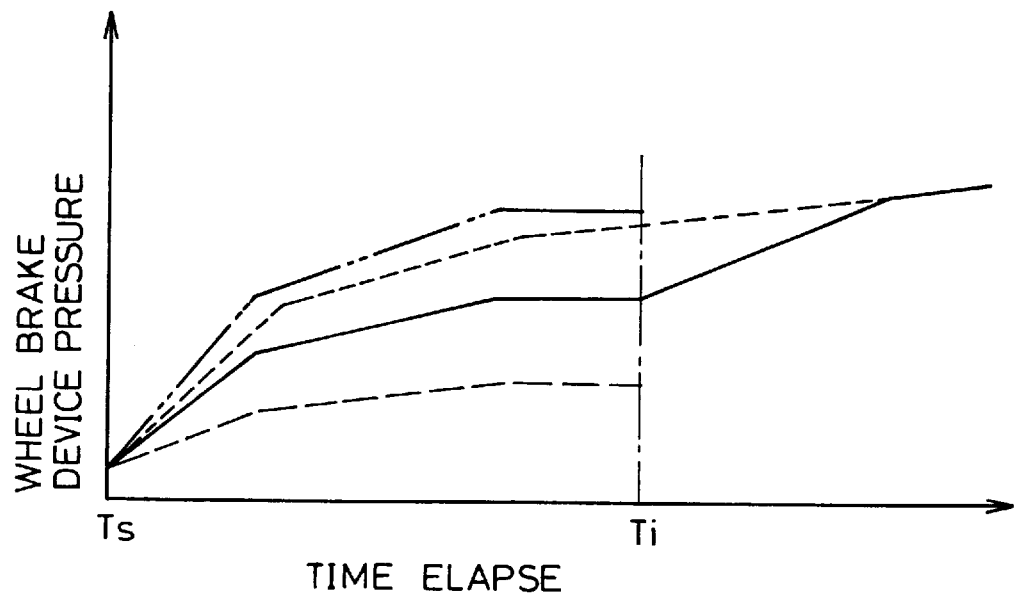
FIG. 6 is a graph showing pressure change in a wheel brake device.
Figure 7:
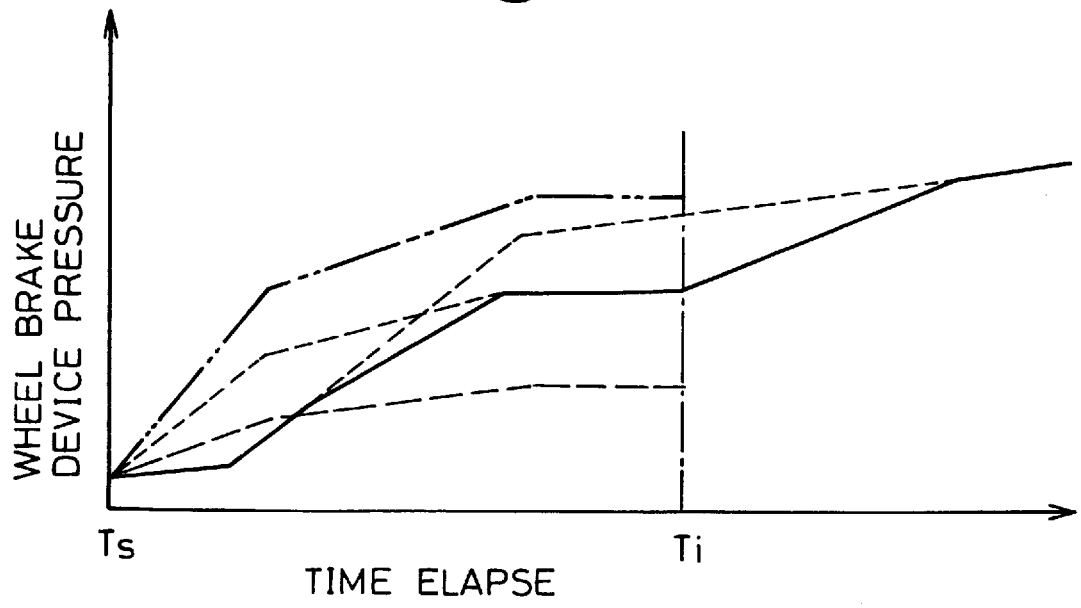
FIG. 7 is a graph showing another pressure change in a vehicle brake control system in which at an initial stage of brake operation a shock is restricted to an as small as possible value to make the vehicle more stable independent of the driver's braking technique.

FIGS. 6 and 7 illustrate the pressure change in the wheel brake device 12A when the foregoing operation following the flowcharts shown in FIG. 2 and 3 is executed. In FIGS. 6 and 7, the bold real line indicates the pressure in the wheel brake device 12A and the dotted line indicates the basic target pressure Ptr derived from the operation force based on FIG. 4. FIG. 6 shows the pressure change in the wheel brake device 12A in the situation where the basic target pressure Ptr remains inside the region between the lines "b" and "c" in FIG. 5 from the initiation of the braking operation. During the time duration ranging from the brake operation initiation time Ts to a time Ti, the pressure in the wheel brake device 12A is maintained at the predetermined target pressure Ptrb, and after elapse of the time Ti the pressure in the wheel brake device 12A is changed from the predetermined target pressure Ptrb to the basic target pressure Ptr at a gradual constant rate. Thus, the brake shock at the beginning of the normal brake operation can be restricted to an as small as possible value which is independent of the driver's braking technique.

FIG. 7 shows the pressure change in the wheel brake device 12A in the situation where the basic target pressure Ptr is below the line "c" in FIG. 5 when the brake operation is initiated enters the region between the lines "b" and "c" in FIG. 5 before elapse of the time Ti. Under such a condition, although the pressure in the wheel brake device 12A is restricted to the basic target pressure Ptr, after entering the foregoing region the pressure in the wheel brake device 12A is changed at a gradual rate from the basic target pressure Ptr to the predetermined target pressure Ptrb. After elapse of time Ti, the pressure in the wheel brake device 12A is changed at a gradual rate from the predetermined target pressure Ptrb to the basic target pressure Ptr.

Figure 8:
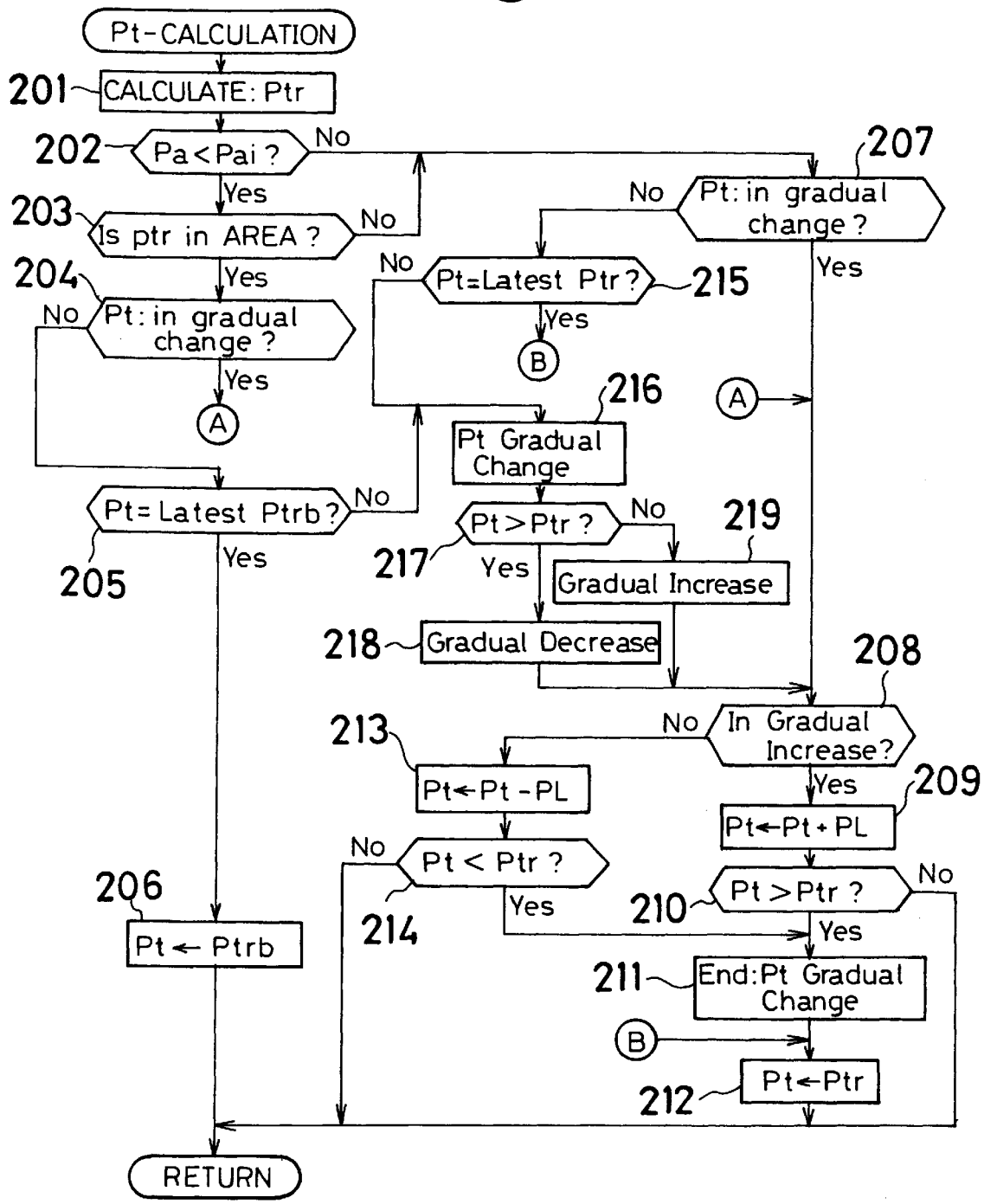
FIG. 8 is a flowchart similar to FIG. 2, but illustrating an alternative manner of operation.

In the foregoing embodiment of the present invention, the initial stage of brake operation is defined by the elapsed time Ti measured from the initiation time Ts of the brake operation. As an alternative, as can be seen from the flowchart shown in FIG. 8, the initial stage of brake operation can be defined as the time duration ranging from the initiation time Ts of brake operation to a time when the real pressure Pa in the wheel brake device 12A exceed a predetermined pressure Pai. Thus, the embodiment shown in FIG. 8 differs from that shown in FIG. 3 with respect to step 202A. At step 202A, it is determined whether or not the real pressure Pa in the wheel brake device 12A is less than the predetermined pressure Pai. If so, the program routine proceeds to step 203. If not, step 207 is executed. The program steps executed in the embodiment shown in FIG. 8 are similar in other respects to those executed in the program shown in FIG. 3.

In the foregoing two embodiments, the pressure in the wheel brake device 12A is used as a variable or physical quantity which represents or indicates a vehicle braking force. However, as an alternative, and as can be understood from the flowcharts depicted in FIGS. 9 and 10, the variable indicating the vehicle braking force can be a vehicle deceleration acting in the longitudinal direction of the vehicle body. In such a case, a vehicle deceleration sensor 14 detects such a vehicle deceleration and issues an electric signal to the controller 13 that corresponds to the vehicle deceleration.

Figure 9:
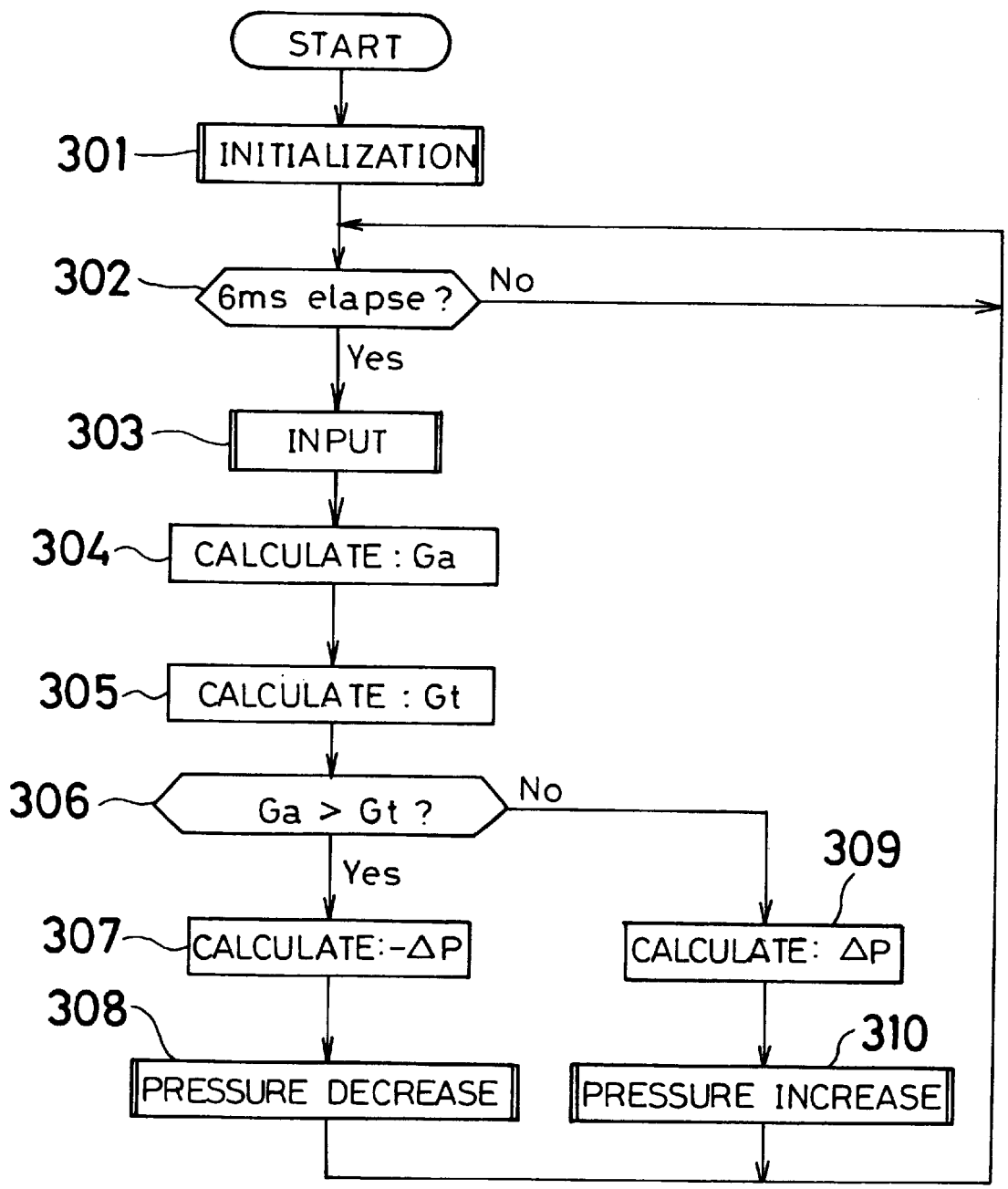
FIG. 9 is a flowchart similar to FIG. 2, but illustrating a further alternative manner of operation.

Referring to FIG. 9, which corresponds to FIG. 2 in the above-described embodiment, the system is initialized at step 301. Then, at step 302, it is determined whether or not a time period of 6 milliseconds has elapsed. If so, the program routine proceeds to step 303. At step 303, an input procedure is established by receiving or reading signals from the operation sensor 11A, the stop switch 11B, the pressure sensor 12C, and the vehicle deceleration sensor 14. Then, based on the signal outputted from the pressure sensor 12C, an actual vehicle deceleration Ga is calculated at step 304.

Next, at step 305, a target vehicle deceleration Gt is calculated based on the electric signals outputted from the operation force sensor 11A and the stop switch 11B, respectively. The way in which the target vehicle deceleration Gt is calculated will be described in detail below with reference to FIG. 10. The resultant target vehicle deceleration Gt is compared to the actual vehicle deceleration Ga at step 306. If the result of step 306 reveals that the actual vehicle deceleration Ga is greater than the target vehicle deceleration Gt, a decrement pressure $\Delta P$ is calculated at step 307 based on the deviation between the actual vehicle deceleration Ga and the target vehicle deceleration Gt. Then, at step 308 a pressure decrease electromagnetic valve operation is established for decreasing the braking force by the value $\Delta P$ by driving the pressure decreasing electromagnetic valve 12E. Thereafter, the program routine returns to step 302.

If the result of step 306 reveals that the actual vehicle deceleration Ga is not greater than the target vehicle deceleration Gt, an increment pressure $\Delta P$ is calculated at step 309 based on the deviation between the actual vehicle deceleration Ga and the target vehicle deceleration Gt. Then, at step 310 a pressure increase electromagnetic valve operation is established for increasing the braking force by the value $\Delta P$ by driving the pressure increasing electromagnetic valve 12D. Thereafter, the program routine returns to step 302.

Figure 10:
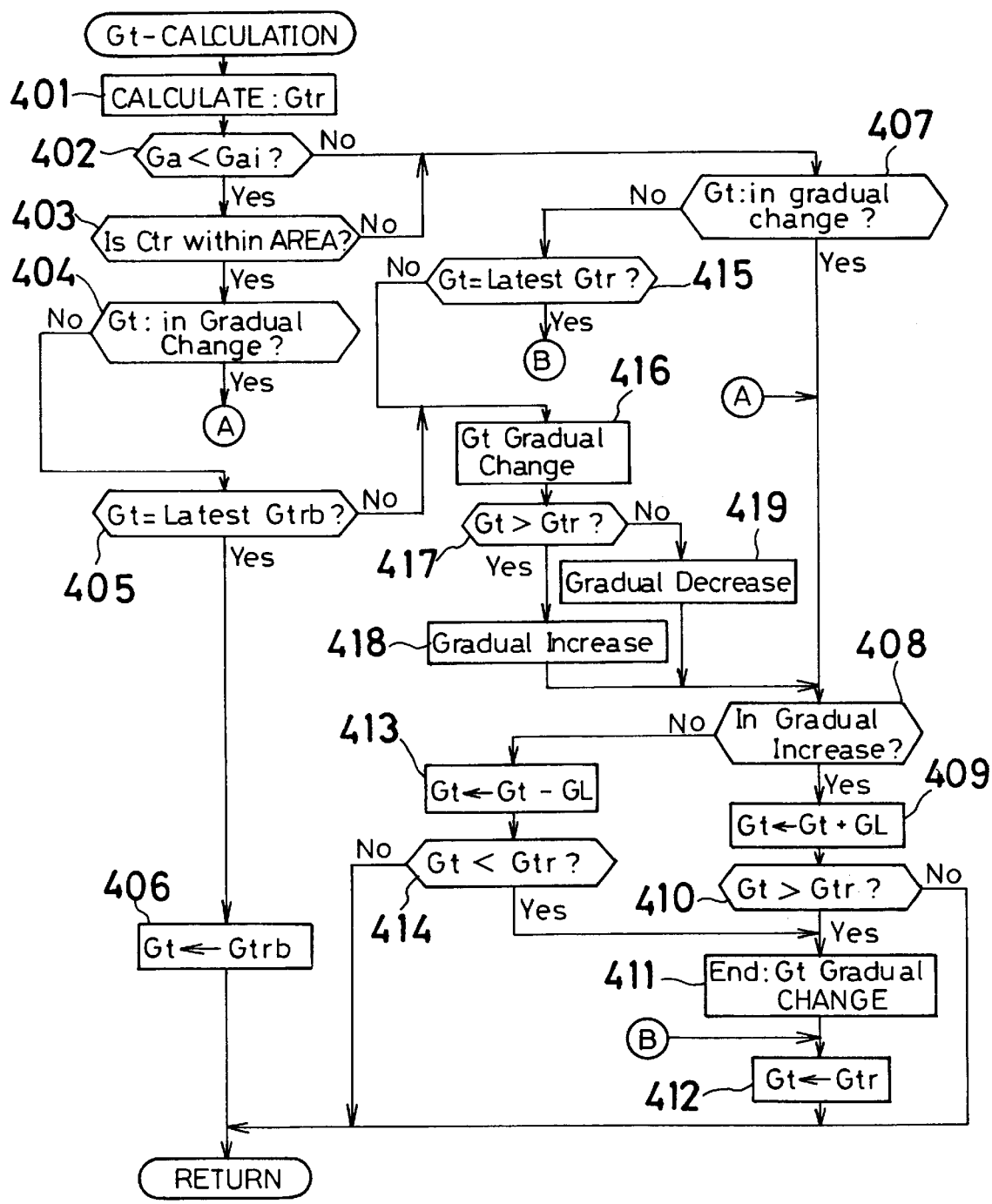
FIG. 10 is a flowchart illustrating the way in which a vehicle longitudinal deceleration Gt is calculated.
Figure 11:
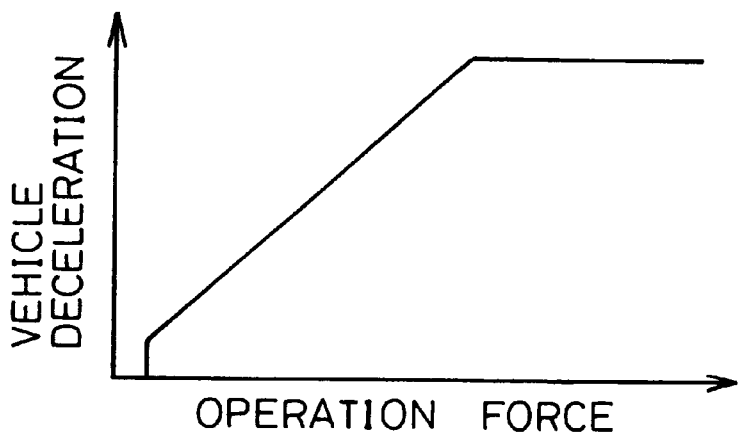
FIG. 11 is a graph showing the relationship between an operation force and a basic target vehicle longitudinal deceleration.
Figure 12:
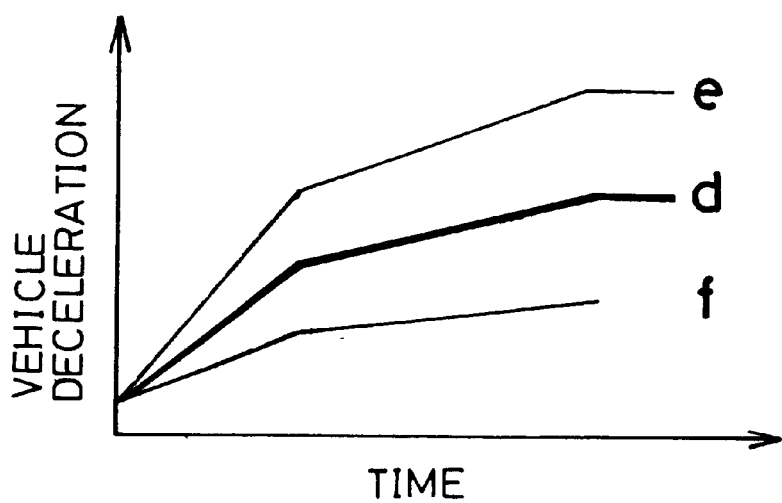
FIG. 12 is a graph of a target vehicle longitudinal deceleration during an initial stage of brake operation.

FIG. 10 is a flowchart showing in detail how the target vehicle deceleration Gt in step 305 of the flowchart in FIG. 9 is calculated. First, at step 401 a basic target vehicle deceleration Gtr is calculated with reference to FIG. 11 which shows the relationship between operation force and basic target deceleration. Then, at step 402 it is determined whether or not the actual target vehicle deceleration Ga is less than a threshold value of Gai. If so, it is determined at step 403 whether or not the basic target vehicle deceleration Gtr after initiation of braking operation falls within the region between the real lines "e" and "f" in FIG. 12. In FIG. 12, the real line or target line "d" denotes a predetermined target deceleration Gtrb whose increase rate is set to establish an as small as possible brake shock at the initial stage of the braking operation. The real line "e" indicates an upper permissible deviation from the target line "d" and the line "f" indicates a lower permissible deviation from the target line "d".

If the result of step 403 reveals that the basic target deceleration Gtr falls inside the region between the lines "e" and "f", step 404 is executed to determine whether or not a gradual target deceleration Gt change procedure is being performed. The gradual target deceleration Gt change procedure is a procedure for gradually bringing one of the basic target deceleration Gtr and the alternate target deceleration Gtrb near the other one. This procedure is executed at step 408. If the gradual target deceleration Gt change procedure is not being performed, the program routine proceeds to step 405 to determine whether or not the latest value of the target deceleration Gt is equal to the latest value of the predetermined target pressure deceleration Gtrb. In other words, in step 405, it is determined whether or not the target deceleration Gt is entering the above-mentioned region from outside. If the determination in step 405 is yes, it is understood that such entrance is not occurring, the value of the predetermined target deceleration Gtrb is substituted to the target deceleration Gt, and the program routine then proceeds to RETURN.

If it is determined in step 404 that the target deceleration Gt is being changed gradually, the program routine proceeds to step 408 for checking whether or not such a gradual change of the target deceleration Gt is in the direction of increase. If the gradual change of the target deceleration Gt is in the direction of increase, the current value of the target deceleration Gt is calculated at step 409 to add the latest value of the target deceleration Gt with a value GL. Next, at step 410, it is determined whether or not the target deceleration Gt is greater than the basic target deceleration Gtr. If so, the program routine proceeds to step 411 where a termination of the gradual increase procedure of the target deceleration Gt is conducted. Then, after substituting the value of the basic target deceleration Gtr for the target deceleration Gt, the program routine proceeds to RETURN.

If the result of step 408 indicates that no gradual increase procedure of the target deceleration Gt is being executed or that the target deceleration Gt is being gradually decreased, the program routine proceeds to step 413 at which the current value of the target deceleration Gt is calculated by subtracting the value GL. Then, it is determined at step 414 whether or not the target deceleration Gt is less than the basic target deceleration Gtr. If so, the program routine goes to step 411. If not, the program routine proceeds to RETURN.

If the result of step 405 reveals that the latest value of the target deceleration Ct is not equal to the latest value of the predetermined target deceleration Gtrb, step 416 is executed to initiate the target deceleration Gt gradual change procedure. Then, the program routine proceeds to step 417 at which it is determined whether or not the target deceleration Gt is greater than the basic target deceleration Gtr. If the target deceleration Gt is greater than the basic target deceleration Gtr, after initiating the target deceleration Gt gradual decrease procedure at step 418, the program routine proceeds to step 408. If the target deceleration Gt is not greater than the basic target deceleration Gtr, after initiating the target deceleration Gt gradual increase procedure at step 419, the program routine proceeds to step 406.

In situations where the result of step 402 indicates that the actual vehicle deceleration Ga is not less than the threshold value Gai or where the result of step 403 reveals that the basic target deceleration Gtr falls outside the region between the real lines "e" and "f" in FIG. 12, the program routine proceeds to step 407 at which it is determined whether or not the target deceleration Gt gradual change procedure is being executed. If so, the program routine proceeds to step 408. If not, step 415 is executed to determine whether or not the latest value of the target deceleration Gt is equal to the latest basic target deceleration Gtr. If the result of step 415 is positive, the program goes to step 412. If the result of step 415 is negative, the program goes to step 416.

The embodiments of the present invention are described above in the context of a hydraulic type vehicle brake control system. However, it is to be understood that the present invention also has application to an electrical type vehicle brake control system. In addition, such vehicle brake control system can be modified to exclude the wheel brake device.

In the foregoing embodiments, when one of the basic target variable and the predetermined variable is replaced with the other, the former is changed to the latter at a gradually constant rate. However, as an alternative to such a gradually constant rate, a higher changing rate can also be employed that is in proportion to the deviation between the former and the latter. Moreover, instead of using the operation force as the vehicle brake control variable, the stroke of the vehicle brake member can be employed. Furthermore, when the master cylinder is provided in the vehicle brake control system, the master cylinder output pressure can be used as the vehicle brake control variable.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:
1. A vehicle brake control system comprising;
   a vehicle brake force detecting device outputting an electric signal representing a physical variable as vehicle braking force after a detection thereof;
   a vehicle brake operation quantity detecting device outputting an electric signal representing a vehicle brake operation quantity after a detection thereof; and
   a control device calculating an actual value of the physical variable based on the electric signal from the vehicle brake force detecting signal, calculating a target value of the physical value based on the electric signal from the vehicle brake operation quantity detecting device, and controlling an input to a vehicle brake device by bringing a deviation between the actual and target values to zero, the control device operating such that at an initial stage of the brake operation an initial target value is generated by using a predetermined target value which is not corresponding to the electric signal from the brake operation quantity detecting device.

2. A vehicle brake control system as set forth in claim 1, wherein the target value is an inputted variable to the vehicle brake device.

3. A vehicle brake control system as set forth in claim 1, wherein the target value is a deceleration of a vehicle.

4. A vehicle brake control system as set forth in claim 1, wherein the initial stage of the brake operation is a time duration between an initiation of the brake operation and an elapsed time starting therefrom.

5. A vehicle brake control system as set forth in claim 1, wherein an increasing rate of the target value is determined as an area between an upper increasing rate and a lower increasing rate, if the target value falls on the area an alter target value is treated an initial target value, if the target value falls outside the area the target value is treated as the target value.

6. A vehicle brake control system as set forth in claim 5, when one of the alternate target value and the target value which is being treated is replaced with the other, the latter is changed gradually to the one.

* * * * *

UNITED STATES PATENT AND TRADEMARK OFFICE
CERTIFICATE OF CORRECTION

PATENT NO. : 6,164,735
DATED : December 26, 2000
INVENTOR(S) : H. AIZAWA, et al.

It is certified that error appears in the above-identified patent and that said Letters Patent is hereby corrected as shown below:

On title page,
Address of first inventor is changed to:

[75] Inventors: Hiroaki Aizawa, Kariya

Signed and Sealed this

Fifth Day of June, 2001

*Attest:*

NICHOLAS P. GODICI

*Attesting Officer*

*Acting Director of the United States Patent and Trademark Office*